United States Patent Office 3,432,561
Patented Mar. 11, 1969

3,432,561
PREPARATION OF ALKYL CHLORIDES BY THE REACTION OF ALKYL ALCOHOLS WITH PHOSPHORUS TRICHLORIDE
Zaven A. Dadekian, Suffern, and David S. Wilbourn, Croton-on-Hudson, N.Y., assignors to Baird Chemical Industries, Inc., New York, N.Y., a corporation of New York
No Drawing. Filed Mar. 28, 1966, Ser. No. 544,337
U.S. Cl. 260—652                                   9 Claims
Int. Cl. C07c 17/16

ABSTRACT OF THE DISCLOSURE

Alkyl chlorides are formed by chlorinating alkyl alcohols in the liquid phase with a molar excess of $PCl_3$. The temperature is maintained at less than 80° C. while the $PCl_3$ is added. Thereafter, the temperature is increased at least 10° to a range of from 80 to 150° C. for at least two hours.

---

This invention relates to a new and improved process for the preparation of alkyl chlorides. More specifically, this invention is directed towards the preparation of high molecular weight alkyl chlorides by the reaction of alcohols with phosphorous trichloride.

Alkyl chlorides are of importance in the chemical industry both per se and as intermediaries for the preparation of other chemicals, as, for example, alkyl dimethylamines, alkyl morpholines, alkyl mercaptans and quaternary ammonium compounds.

The preparation of alkyl chlorides by the chlorination of the corresponding alkyl alcohols is well known. Many chlorinating agents have been cited in the literatures, such as anhydrous hydrochloric acid, phosphorous trichloride and pentachloride, and thionyl chloride. These procedures, while forming substantial amounts of the desired alkyl chloride, do not result in essentially complete conversion of the alcohol to a high purity product. These common processes require further purification steps such as distillation to achieve specification grade material.

In accordance with this invention it has been found that substantially quantitative yields of high purity alkyl chlorides can be formed by reacting the alkyl alcohol with the phosphorous trichloride in a two stage process.

As another embodiment of the invention, it has been found that the quality of the product can be significantly improved by using a slight molar excess within well defined limits of the chlorinating agent. The crude product is water-white without distillation or other methods of purification.

The two-stage process is performed in a closed vessel as follows: In the first stage the temperature of the reaction medium is carefully maintained at less than 80° C., preferably from 65° C. to 50° C.

Broadly, the lower limit is determined by the melting point of the alcohol, i.e., the reaction is to be conducted in the liquid phase, or, particularly in the case of the lower alcohols, at an appropriate cooling water temperature differential. Because of the convenience of using cooling water at about room temperature, this latter criterium would set the lower limit at about 30° C. Since the reaction is exothermic it is necessary to cool the reaction medium during this stage to maintain the desired temperature and to control the rate of addition of the phosphorous trichloride. Failure to maintain the reaction temperatures below the maximum limit results in the formation of undesirable by-products such as the dialkyl ethers. The reaction at this stage is virtually instantaneous.

After all the phosphorous trichloride is added, the first stage of the reaction is complete. The time necessary for the phosphorous trichloride addition depends on the thermodynamics of the particular system and is limited mainly by the cooling capacity which must be sufficient to prevent the temperature from rising above the prescribed limit.

The second stage of the reaction is initiated by raising the temperature so that a mildly exothermic reaction begins. No chlorinating agent is added during this stage. During this stage of the reaction, the temperature should be maintained between 80° C. and 150° C., preferably 120° C. and 135° C., for a period of 2 to 5 hours. Higher temperatures can be used, but these are not advantageous, particularly in light of the attendant increase in pressure. Lower temperatures unduly delay the completion of the reaction. The temperature of the second stage should be at least 10° C. greater than the first stage, preferably 50° C. greater.

To obtain a highly pure product near theoretical yields, a molar excess of phosphorous trichloride of 2 to 15%, preferably, 3 to 7%, is added. All water should be excluded from the system. Molar excesses of greater than 15% should be avoided, especially with long batch cycles at high temperatures, because of extremely undesirable side reaction, e.g., the generation of phosphine, an explosive and toxic material. The use of stoichiometric amount, i.e., no molar excess, results in low alkyl chloride conversions and a product having poor color.

The alkyl alcohols of the instant invention may have from 4 to 22 carbon atoms, preferably, from 8 to 18. They may be primary, secondary, normal or branched chain. Either natural or synthetic alcohols are satisfactory and, within the above ranges, they may have an odd or even number of carbon atoms. Though monohydric alcohols are of primary interest the invention may be applied to dihydric or polyhydric alkyl alcohols.

Illustrative of the alkyl alcohols which may be chlorinated are: n-butyl alcohol, isobutyl alcohol, sec-butyl alcohol, n-amyl alcohol, n-hexyl alcohol, n-octyl alcohol, capryl alcohol, hendecyl alcohol, lauryl alcohol, tridecyl alcohol, myristyl alcohol, pentadecyl alcohol, cetyl alcohol, stearyl alcohol, eicosyl alcohol, docosyl alcohol and hexamethylene glycol.

The reaction vessel must be able to withstand pressures up to about 175 p.s.i.g. This pressure is developed during the reaction and peaks as the temperature increases at the beginning of the second stage.

To illustrate the invention more clearly the following examples are set forth:

Example I

The chlorination reaction is conducted in a 2,000 gallon working capacity glass-lined Pfaudler reactor rated for 200 p.s.i. working pressure. The reactor under vacuum is loaded with 1700 gal. (12,000 lbs.) of dodecyl alcohol. Phosphorous trichloride accurately measured in 5% molar excess is loaded into the steel feed tank above the reactor. Caution is exercised during the charging procedure so that no water enters the reactor, pumps, lines, or meters since even small amounts of water will disturb the proper $PCl_3$-alcohol ratio due to reaction with the $PCl_3$.

Full cold water is put on the jacket of the reactor and the $PCl_3$ is gradually fed into the batch over a period of about 2¾ hrs. under temperature control. As the $PCl_3$ is added a substantial exotherm results and the rate of addition is limited by the heat transfer to the cold water in the jacket. At the end of the $PCl_3$ addition, the first stage of the reaction, the pressure is approximately 90 p.s.i. The second stage of the reaction begins with draining of the cold water in the jacket and introducing steam to raise the batch temperature to 100° C. A mildly exothermic reaction begins at about this temperature and the pressure increases. The pressure peaks at about 175 p.s.i.g. and then decreases. About 1½ hours after the exotherm is noted the batch temperature reaches 125° C. It is held at this temperature for three hours. During this period the batch pressure decreases to approximately 85 p.s.i.

When the reaction is complete, water is added to dissolve residual HCl gas, wash the organic phase, and dilute the acid phase. The acid bottom phase is extremely corrosive and may be neutralized or otherwise disposed of as a waste stream. The wash procedure is repeated a second time and a second cut is made. The dodecyl chloride layer is finally neutralized with a solution of soda ash and then blown into a storage tank to settle.

Based on the dodecyl alcohol, the percent conversion to dodecyl chloride is 98 to 99%. The product is clear and water-white and no further purification is required.

Example II

Using the procedure described in Example I, n-octyl alcohol is chlorinated with $PCl_3$. The $PCl_3$ is added over a period of four hours. About 98% conversion to octyl chloride is obtained at 98% purity.

Example III

Again using the procedure described in Example I, stearyl alcohol is chlorinated. The $PCl_3$ is added in about 1¾ hours. Substantially similar conversions and purity is obtained.

Example IV

A commercial tridecyl alcohol containing mixed branch chained isomers is chlorinated with $PCl_3$. The same reaction conditions are used except the $PCl_3$ is added over a 2½ hour period and the second stage of the reaction is carried out for five hours. Conversions and purity is about 98%.

Example V

A synthetic alcohol prepared by the wax cracking process of $C_{11}$ to $C_{15}$ carbon range is chlorinated as described in Example IV to obtain a mixed alkyl chloride product. The yield is 98% and the purity 95%.

Having thus described our invention, what we claim and desire to protect by Letters Patent is:

1. A process for the preparation of alkyl chlorides which comprises: adding a 2 to 15% molar excess of $PCl_3$ to an alkyl alcohol having from 4 to 22 carbon atoms in the liquid phase while maintaining a temperature from room temperature to less than 80° C.; and subsequently increasing the temperature at least 10° C. to from 80° C. to 150° C. for at least two hours, said process being performed in a closed system.

2. The process of claim 1 wherein said alkyl alcohol is a primary alcohol having from 8 to 18 carbon atoms.

3. The process of claim 1 wherein the temperature is maintained between about 50 and 65° C. during the addition of the $PCl_3$.

4. The process of claim 1 wherein said reaction mixture is increased to a temperature of from 120 to 135° C.

5. The process of claim 1 wherein the molar excess of $PCl_3$ is 3 to 7%.

6. The process of claim 1 wherein said alkyl chloride is dodecylchloride.

7. The process of claim 1 wherein said alkyl chloride is tetradecyl chloride.

8. The process of claim 1 wherein said alkyl chloride is cetyl chloride.

9. A process for the preparation of a primary alkyl chloride which comprises: adding a 3 to 7% molar excess of $PCl_3$ to a primary alkyl alcohol having from 8 to 18 carbon atoms while maintaining a temperature from 50° to 65° C.; increasing the temperature after the $PCl_3$ has been added; and thereafter maintaining a temperature from 120 to 135° C. for at least two hours, said process being performed in a closed system.

References Cited

UNITED STATES PATENTS

| | | | |
|---|---|---|---|
| 2,015,706 | 10/1935 | Brooks | 260—657 XR |
| 2,753,380 | 7/1956 | Pines et al. | 260—652 XR |
| 2,817,686 | 12/1957 | Cicero et al. | 260—652 XR |
| 3,111,545 | 11/1963 | Nobis et al. | 260—652 |
| 3,294,847 | 12/1966 | Albright et al. | 260—615 |
| 3,325,548 | 6/1967 | Majewski et al. | 260—615 |

LEON ZITVER, *Primary Examiner.*

HOWARD T. MARS, *Assistant Examiner.*